United States Patent
Liang et al.

(10) Patent No.: US 11,544,021 B2
(45) Date of Patent: Jan. 3, 2023

(54) PRIVATE SERVER IMPLEMENTATION OF POLICY FOR CARRYOVER AND BORROWING USAGE

(71) Applicant: KYOCERA DOCUMENT SOLUTIONS, INC., Osaka (JP)

(72) Inventors: Jin Liang, Dublin, CA (US); Tai Yu Chen, Dublin, CA (US); Michael Ong Martin, Pacheco, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 17/500,353

(22) Filed: Oct. 13, 2021

(65) Prior Publication Data
US 2022/0035582 A1 Feb. 3, 2022

Related U.S. Application Data

(60) Division of application No. 16/822,639, filed on Mar. 18, 2020, now Pat. No. 11,169,753, which is a continuation-in-part of application No. 16/452,038, filed on Jun. 25, 2019, now Pat. No. 10,942,688, which is a continuation-in-part of application No. 16/451,913, filed on Jun. 25, 2019, now Pat. No. 10,817,230, which is a continuation-in-part of application No. 16/452,041, filed on Jun. 25, 2019, now Pat. No. 10,929,548.

(51) Int. Cl.
*G06F 3/12* (2006.01)
*H04L 29/06* (2006.01)
*H04L 9/40* (2022.01)

(52) U.S. Cl.
CPC .......... *G06F 3/1238* (2013.01); *G06F 3/1222* (2013.01); *H04L 63/101* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,861,282 B2 | 12/2010 | Kakigi | |
| 7,969,599 B2 | 6/2011 | Hamada | |
| 9,384,434 B2 | 7/2016 | Adachi | |
| 9,461,820 B1 | 10/2016 | Dall | |
| 2007/0107048 A1 | 5/2007 | Halls et al. | |

(Continued)

*Primary Examiner* — Andrew H Lam
(74) *Attorney, Agent, or Firm* — Millen, White, Zelano & Branigan, P.C.; William Nixon

(57) ABSTRACT

A policy-based printing system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. The private server processes the requests using the policy and a ledger to determine whether to allow the print job to the printing device. If a parameter of the policy is exceeded, then the private server allows usage to be carried over or borrowed from previous and subsequent periods.

7 Claims, 14 Drawing Sheets

(56) References Cited

U.S. PATENT DOCUMENTS

2007/0156659 A1* 7/2007 Lim .................. H04L 63/20
2007/0229874 A1* 10/2007 Hamada ............ G06F 3/1219
　　　　　　　　　　　　　　　　　　　　　　358/1.14
2010/0037285 A1　　2/2010 Cain
2010/0037286 A1　　2/2010 Cain

* cited by examiner

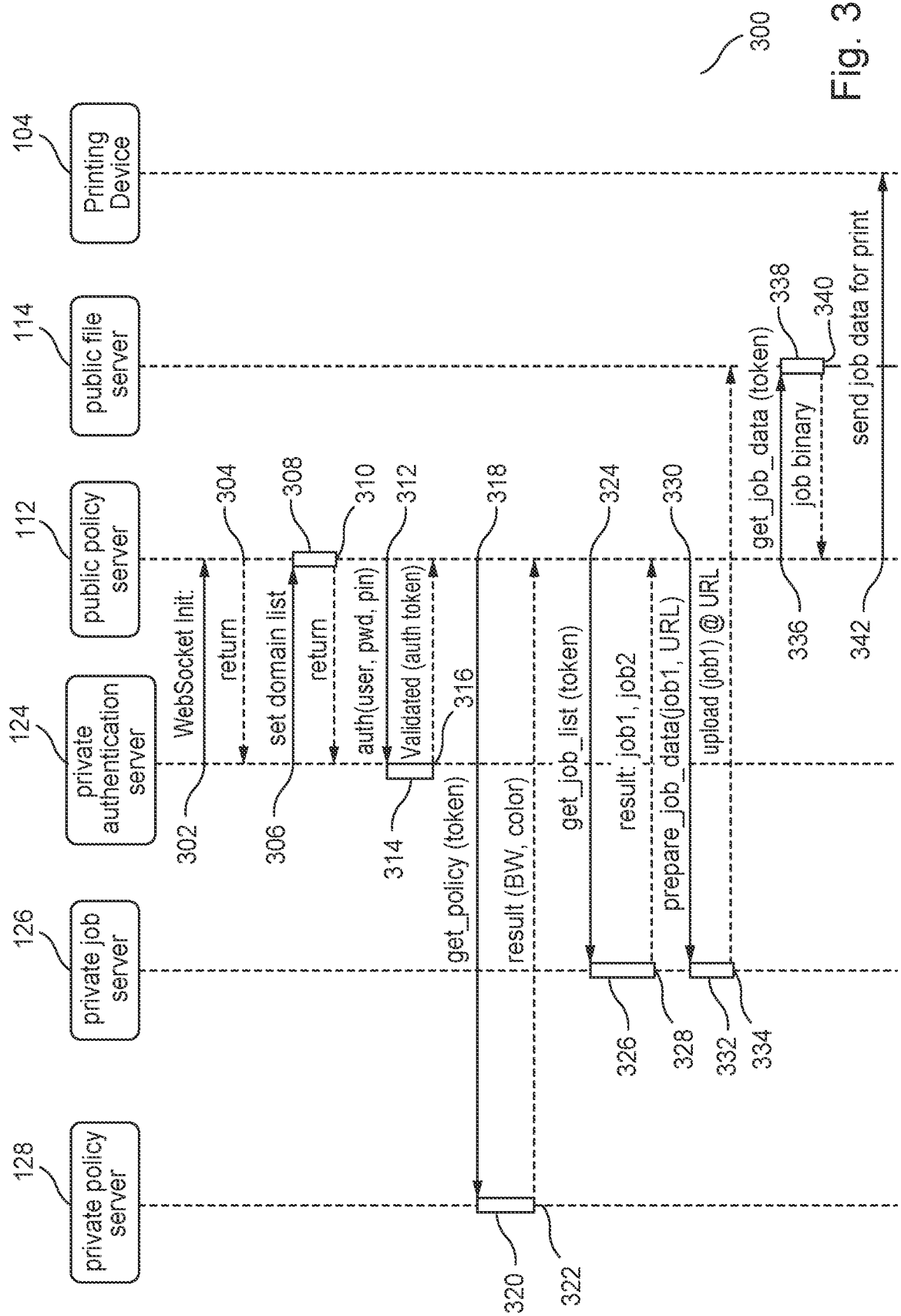

| | | |
|---|---|---|
| Private Domain 120 | @example1.com | 402 |
| | @example2.com | 404 |
| Private Domain 130 | @company.com | 406 |
| Private Domain N | @firm.com | 408 |
| Private Domain N+1 | @college.com | 410 |
| Private Domain X | @website.com | 412 |

400

Fig. 4A

PRIVATE SERVER IMPLEMENTATION OF POLICY FOR CARRYOVER AND BORROWING USAGE

FIELD OF THE INVENTION

The present invention relates to a system of private and public servers that implement policy-based printing operations. The system includes a public and private network that supports the policy used for printing operations, wherein the policy is implemented using a private server in the private network such that unused or future usage is allowed for printing operations.

DESCRIPTION OF THE RELATED ART

Existing policy-based printing systems mostly operate within a closed private domain environment. Print data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print in public locations, such as convenience stores, libraries, airports, copy and printing service stores, and the like. At these locations, the users may not reliably access the printing data. Further, these public locations may not support policy-based printing.

SUMMARY OF THE INVENTION

A method for implementing policy-based printing is disclosed. The method includes applying a policy to determine whether to allow a document to be printed from a private server. A request to print the document is received from a public server. The method also includes determining that a parameter for a current period as set forth in the policy denies the document to be printed. The method also includes compiling usage information associated with the parameter from a previous period from a ledger on the private server. The method also includes determining a carryover usage based on the usage information for the previous period. The method also includes determining whether to allow the document to be printed according to the policy and the carryover usage. The method also includes updating the ledger with the carryover usage.

A method for implementing policy-based printing is disclosed. The method includes applying a policy to determine whether to allow a document to be printed from a private server. A request to print the document is received from a public server. The method also includes determining that a parameter for a current period as set forth in the policy denies the document to be printed. The method also includes compiling usage information associated with the parameter for a subsequent period from a ledger on the private server. The method also includes determining a borrowed usage from the usage information for the subsequent period. The method also includes determining whether to allow the document to be printed according to the policy and the borrowed usage. The method also includes updating the ledger with the borrowed usage.

A private server is disclosed. The private server is configured to apply a policy to determine whether to allow document to be printed from the private server. A request to print the document is received from a public server. The private server also is configured to determine that a parameter for a current period as set forth in the policy denies the document to be printed. The private server also is configured to compile usage information associated with the parameter from another period from ledger on the private server. The private server also is configured to determine unused usage based on the usage information for the another period. The private server also is configured to determine whether to allow the document to be printed according to the policy and the unused usage. The private server also is configured to update the ledger with the unused usage.

A method for implementing policy-based printing is disclosed. The method includes receiving a request to print a document at a private server from a public server. The document is to be printed at a printing device connected to the public server. The method also includes determining a number of pages for the document. The method also includes applying a policy at the private server to determine whether to allow the document to be forwarded to the public server based on the number of pages for the document and usage information for a current period as set forth in the policy. The method also includes denying that the document may be printed based on the application. The method also includes determining a carryover usage based on the usage information for a previous period. The method also includes determining to allow the document to be printed according to the policy and the carryover usage.

BRIEF DESCRIPTION OF THE DRAWINGS

Various other features and attendant advantages of the present invention will be more fully appreciated when considered in conjunction with the accompanying drawings.

FIG. 3 illustrates a flow diagram for implementing a policy-based printing system according to the disclosed embodiments.

FIG. 4A illustrates a domain list for use within the policy-based printing system according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
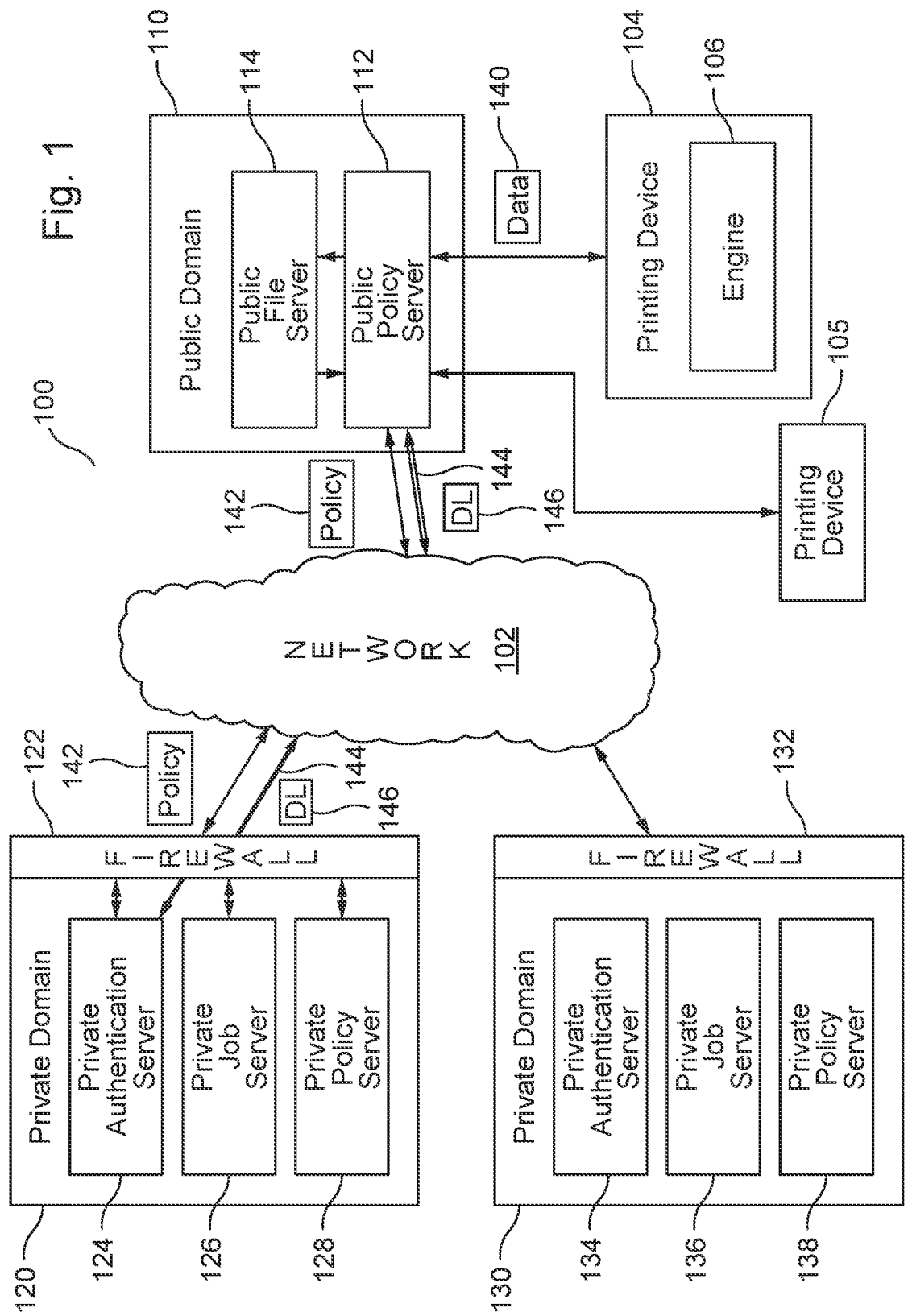
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

Figure 2:
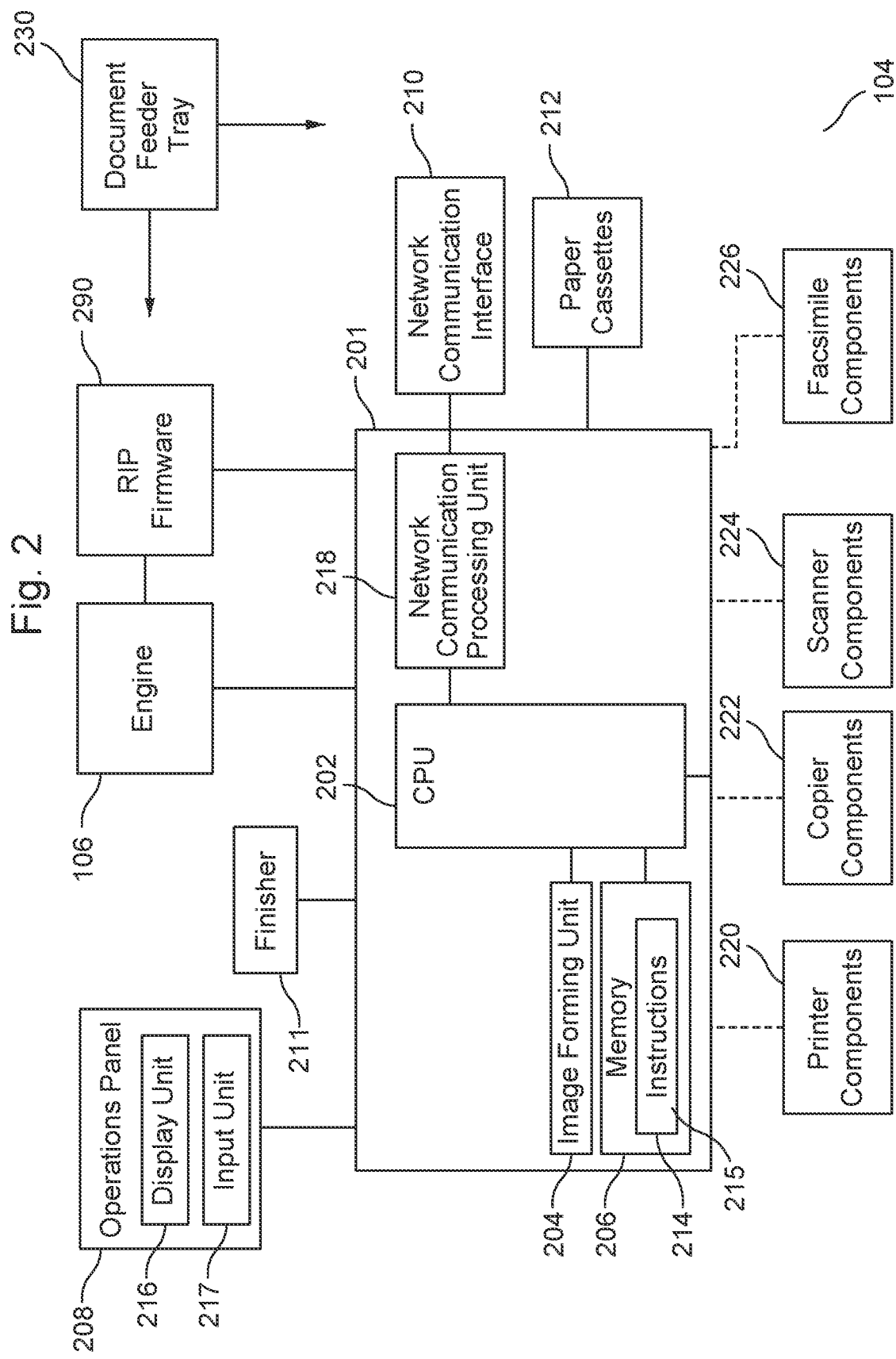
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enter information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Figure 4B:
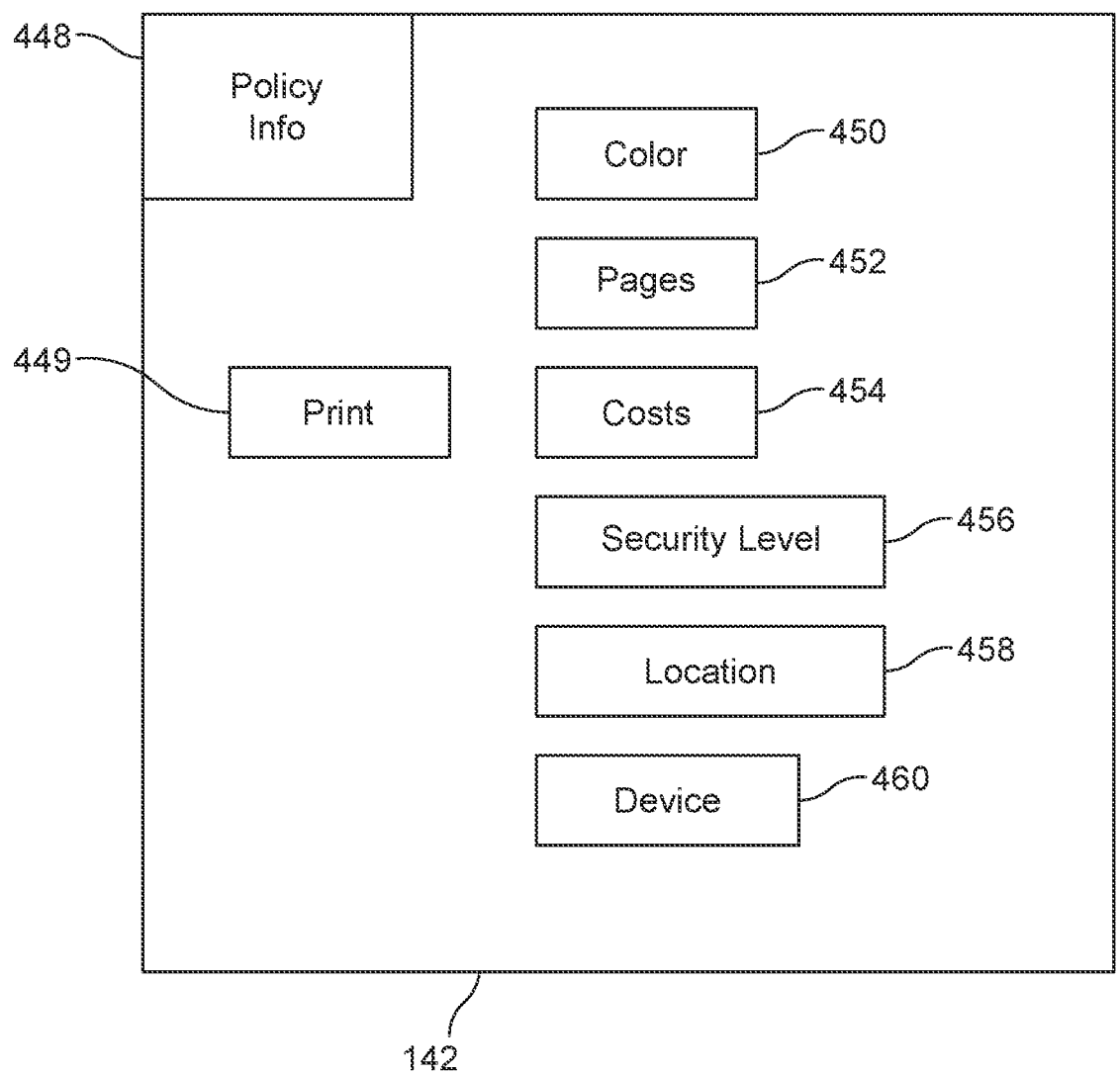
FIG. 4B illustrates a policy for use within the policy-based printing system according to the disclosed embodiments.
Figure 5:
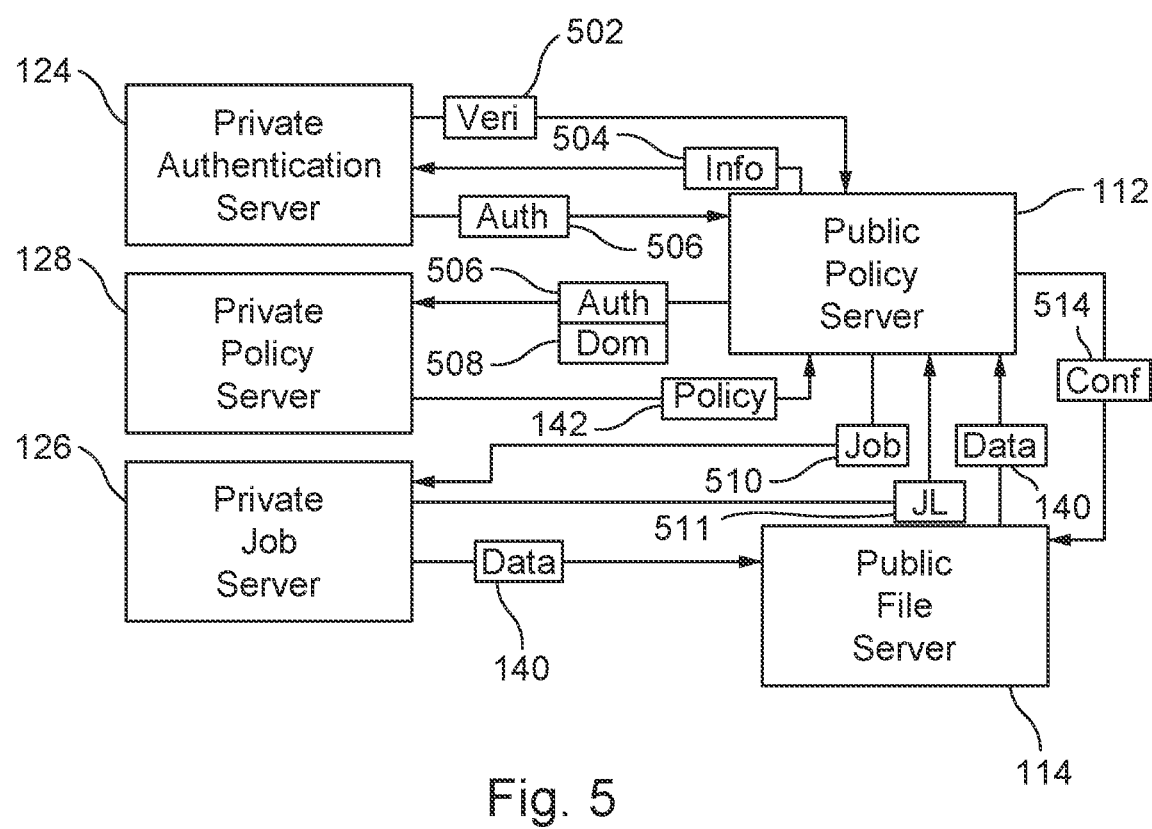
FIG. 5 illustrates a block diagram of servers and data used within the policy-based printing system according to the disclosed embodiments.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
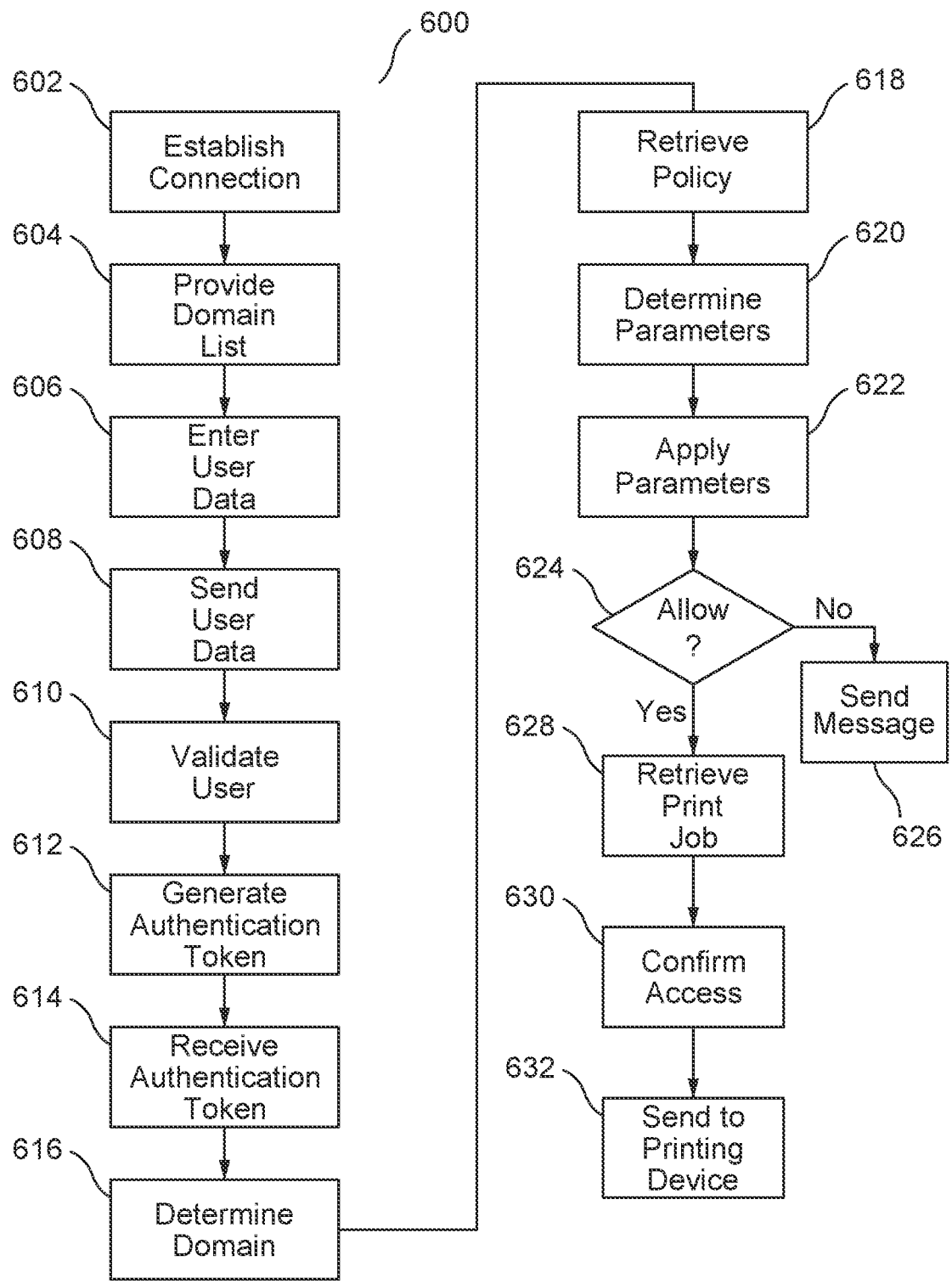
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
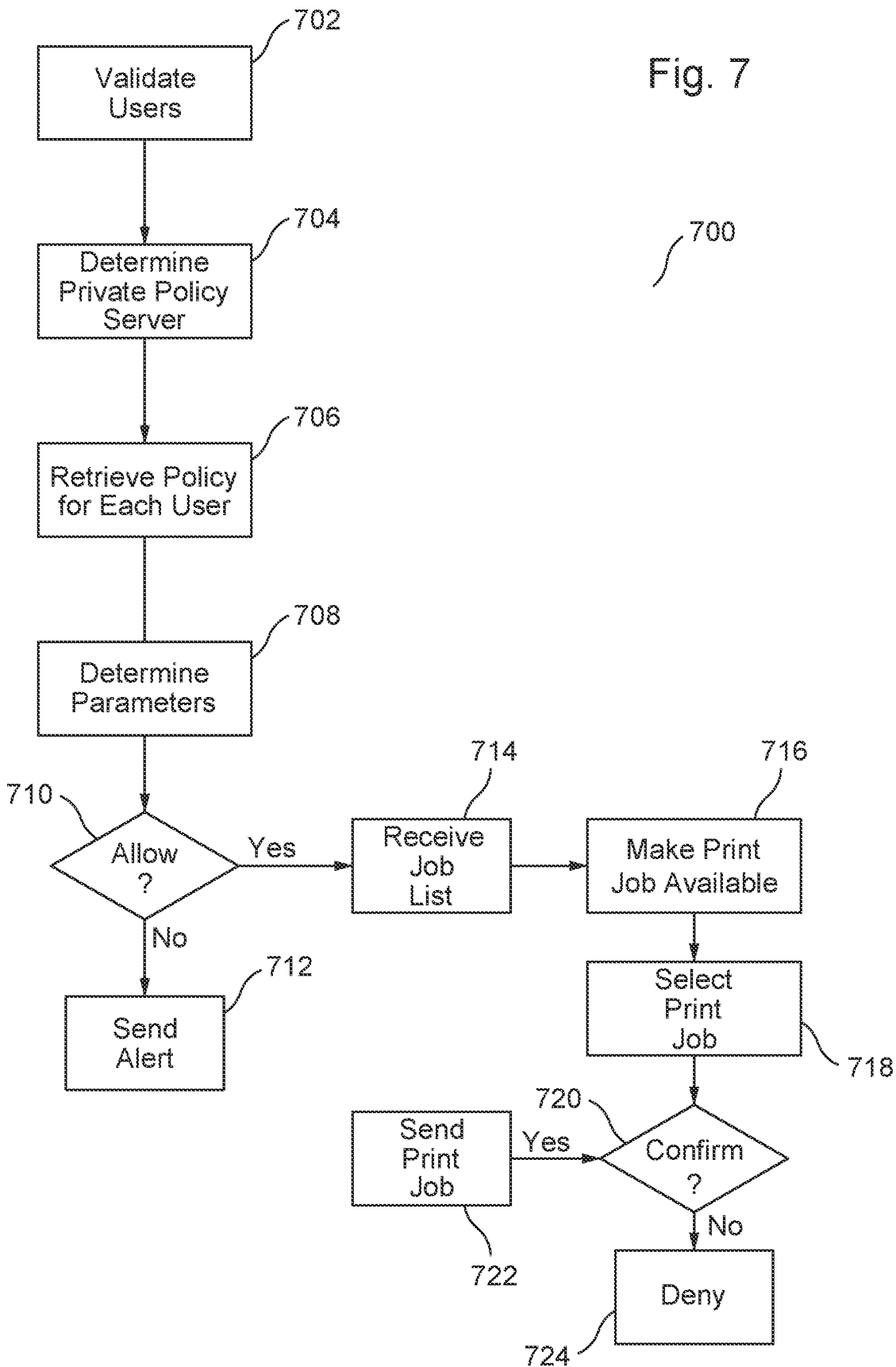
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain. For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
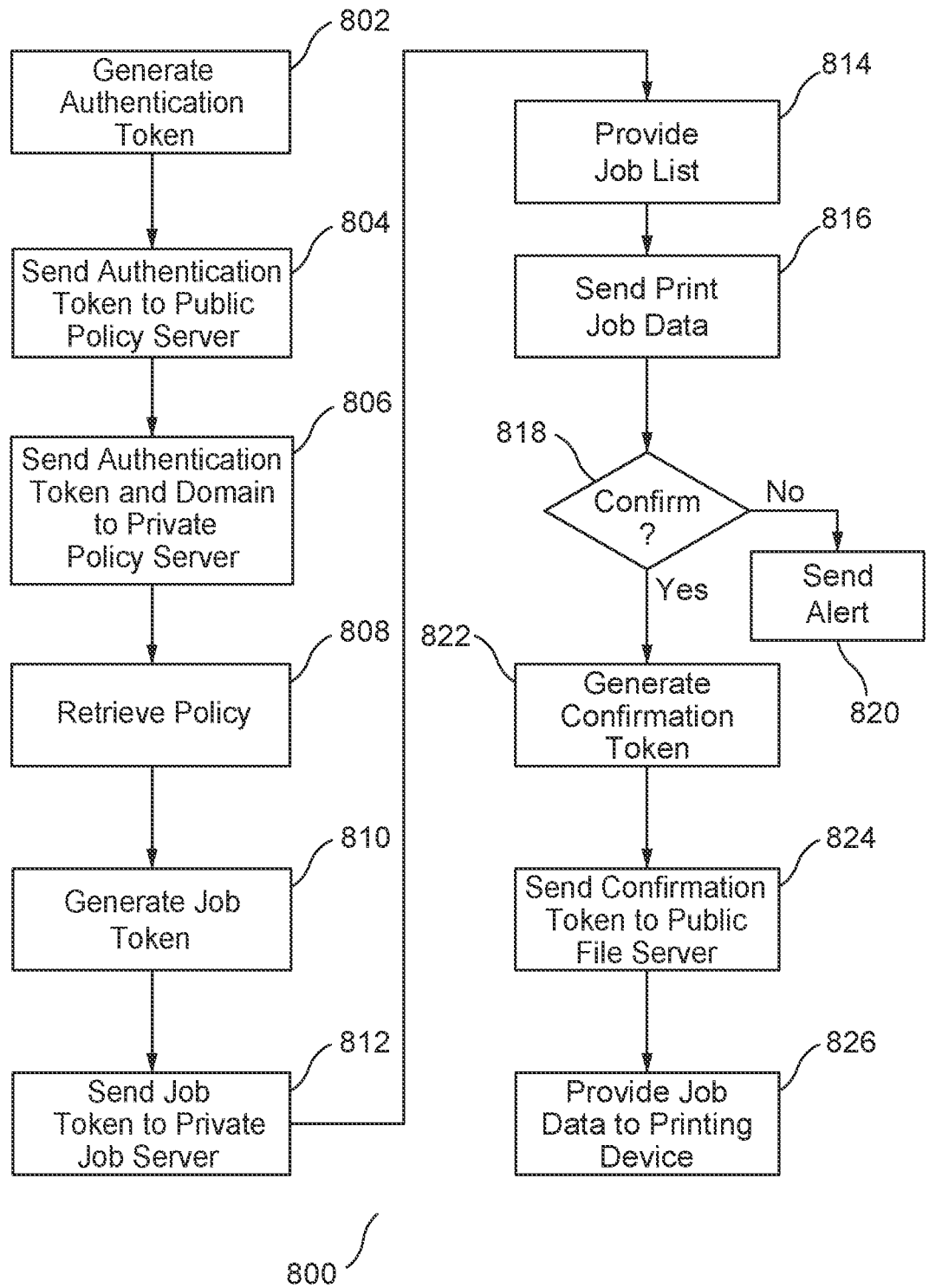
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
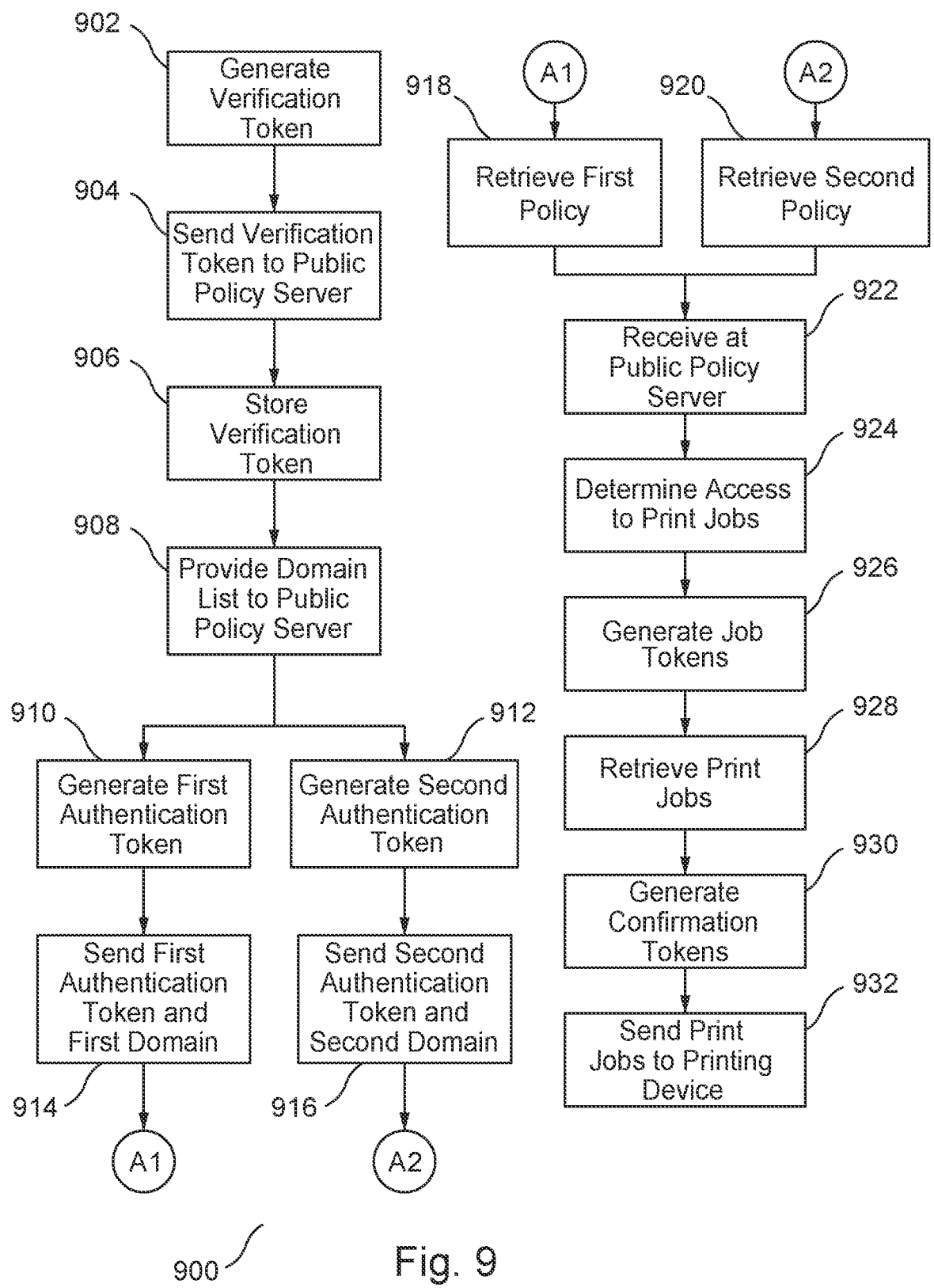
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different to users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

In some embodiments, it may be desired to not provide the policy to the public domain, either in a public domain server or the printing device. The policy could include details that are sent to many components within the system. Some servers and devices may not be able to implement the policy effectively. A policy may be a complex concept. Whenever policy data arrive at the device, the data may need to be parsed correctly and applied correctly when a print job is sent to the device. These operations may impose a heavy burden on the development and maintenance of the device. Preferably, the printing system would like the printing device, for example, to focus on what it does, such as printing, scanning, or copying.

Figure 10:
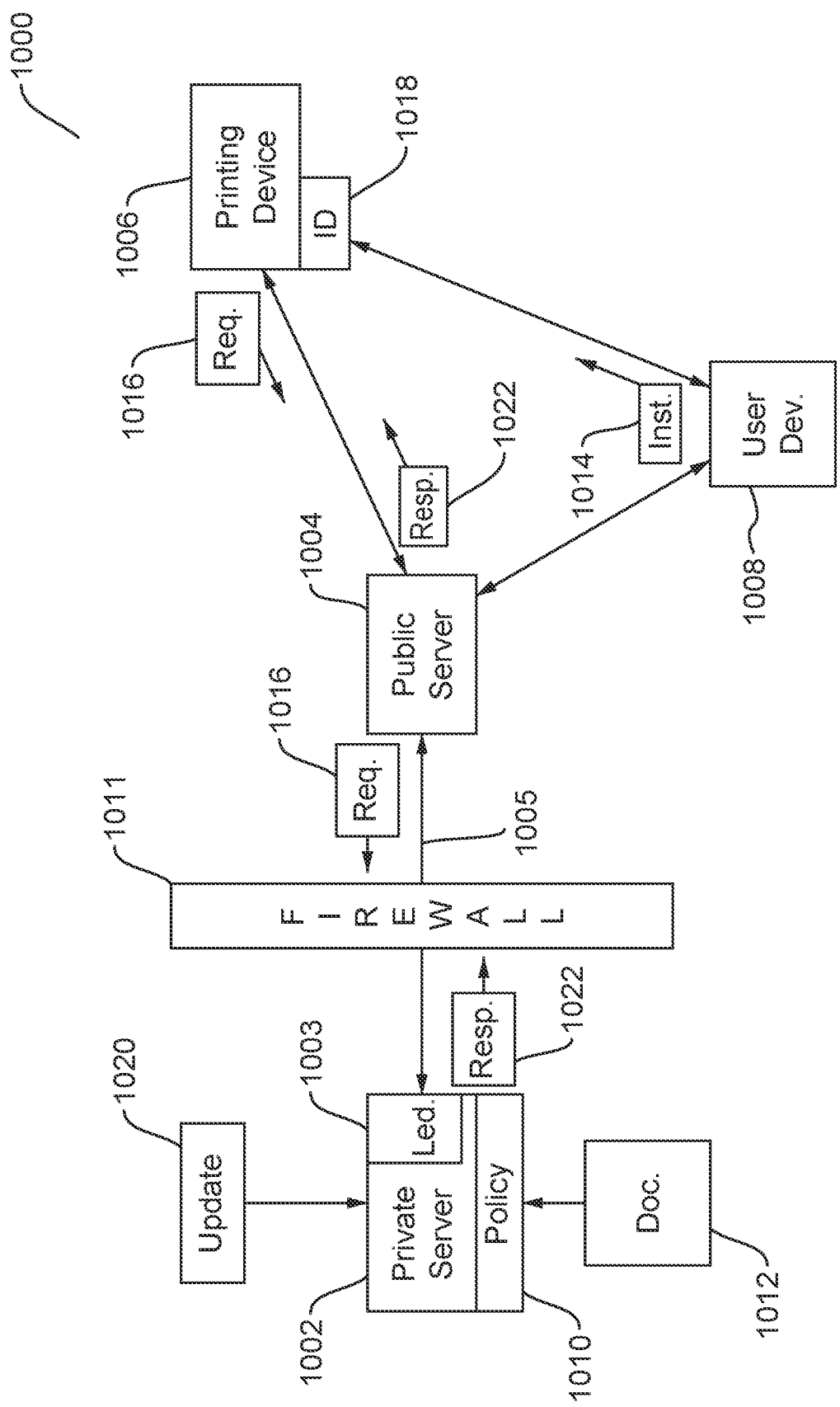
FIG. 10 illustrates a policy-based system to implement policy-based printing using a private server according to the disclosed embodiments.

FIG. 10 illustrates a policy-based system 1000 to implement policy-based printing using a private server 1002 according to the disclosed embodiments. System 1000 may reduce development and maintenance responsibilities in multiple components in the system and provide additional security with an advanced policy. In some embodiments, a private server at the corporate office, or private domain, has the policy set by an administrator. The policy changes frequently and becomes more complex with each evolution of software within the printing system or on the devices.

On the private server, a ledger may exist on the private server that records all the actions performed by all end user who are printing, copying, scanning, and the like within system 1000. The users may utilize printing devices and servers in a public domain such that they perform actions outside the normal corporate environment. A public server may serve as a gateway to the private domain. It may have open websocket bi-directional communication with the private server, as disclosed above. The printing device is connected to the public network and also is connected to the public server to whether it can do a simple action on behalf of the user in processing a document.

Within the disclosed printing system, the user may use allowed printing or access to documents in each policy period in an uneven manner The user does not use the services of the printing devices the same way or amount every period. One period may not use the allotted number of pages to be printed while another period may exceed the limit placed on the user by the policy. Further, usage from a future period may be used and applied to the current period in order to allow the user to print documents. The disclosed embodiments address this imbalance to improve the user experience and provide better usage strategies for the user and the business.

The policy according to some embodiments may be a flexible policy to serve the user and business better as well as provide an optimal usage strategy. When the limit is reached for a particular period, the disclosed embodiments may determine if any carryover usage is available from the past period. If so, then the carryover amount may be added to the current period to allow continued printing. Further, if carryover usage is not available, then the user may "borrow" against the usage for the next period to continue printing. The policy is configurable for each user or group so that an administrator can device who can apply the flexible usage features as well as when it is applied. The policy is not shared by a public server or printing device. Determinations are made at the private server.

FIG. 10 shows a policy-based system 1000 having a private server 1002, a public server 1004, a printing device 1006, and a user device 1008. These components of the system may be disclosed above with regard to FIGS. 1-9. In system 1000, private server 1002 may refer to any of the servers in the private domain, such as private authentication server 124, private job server 126, and private policy server 128 of private domain 120 shown in FIG. 1. Private server 1002 may be used in system 1000 to mean any server or group of servers in a private domain, as disclosed above. Private server 1002 may be separated from servers and printing devices in public domains by firewall 1011. Private server 1002 also stores and applies policy 1010. Policy 1010 may correspond to policy 142 disclosed above.

Public server 1004 may refer to any of the servers in the public domain, such as public file server 114 and public policy server 112 of public domain 110 shown in FIG. 1. Public server 1004 may be accessible by a plurality of printing devices, including printing device 1006. In the public domain, public server 1004 may manage print jobs going to various printing devices. It also may include a connection to private server 1002, which has been verified and authenticated according the processes disclosed above. For example, a websocket connection 1005 may exist between private server 1002 and public server 1004.

Printing device 1006 may receive documents from public server 1004 as well as other sources to print, copy, store, modify, and the like. The features of printing devices according to the disclosed embodiments are disclosed above. Printing device 1006 may include device identification 1018 that indicates a unique identifier within system 1000. In some embodiments, device identification 1018 may be a number, alphanumeric characters, or a combination thereof. Public server 1004 may send documents and files to printing device 1006 based on device identification 1018.

User device 1008 may be a mobile device, tablet, computer, and the like. User device 1008 may move between the private domain and the public domain, as separated by firewall 1011. It also may access private server 1002 as well as public server 1004. A user may send and receive data from the servers at user device 1008. User device 1008 also may send instructions 1014 to printing device 1006 to print, copy, scan, and the like stored documents from private server 1002.

Private server 1002 may upload document 1012. Document 1012 may be similar to the print jobs disclosed above. Document 1012 includes data and information that is transmitted to devices within the private domain. The user of user device 1008 may upload document 1012 within the private domain. Document 1012, however, may be processed and printed at devices outside the public domain and not necessarily at devices connected to private server 1002. Policy 1010 also may be used to determine how and if document 1012 is used within system 1000 outside the private domain.

The user may authenticate user device 1008 to public server 1004 according to the disclosed embodiments. For example, user device 1008 may provide verification data, such as a user/account name and password, to verify the user to public server 1004. This process may be disclosed above with regard to verification between public policy server 112 and private authentication server 124. Alternatively, verification data 1016 may be a token used by user device to authenticate the user in a public domain. Upon authentication, websocket connection 1005 may be established to allow open bi-directional communication between private server 1002 and public server 1004.

In some embodiments, printing device 1006 receives instructions 1014 from user device 1008 to process document 1012. An electronic copy of document 1012 may be sent to printing device 1006 to process and print, copy, scan, and the like. The user also may modify the electronic copy. In summary, a document stored on private server 1002 is made available on a public device.

Before receiving document 1012, printing device 1006 in conjunction with public server 1004 and private server 1002 may determine whether any action on behalf of the user is allowed at the printing device. An action by printing device 1006 is a simple operation of print, copy, scan, and the like. It may be measured in the smallest scale possible, such as a single page at a time. Thus, printing device 1006 may send request 1016 to public server 1004, which is then forwarded to private server 1002. Preferably, request 1016 includes queries for policy 1010 as closed questions that result in a YES or NO response. Printing device 1006 merely has to determine whether it can perform an operation or not. Printing device 1006 does not do any analysis of policy 1010.

Public server 1004 receives request 1016 pertaining to the user instructions to printing device 1006 to process document 1012. Public server 1004 may forward request 1016 without further processing. In other embodiments, public server 1004 may break down request 1016 into smaller requests that permit the responses to be in a YES or NO format. Upon receipt of responses from private server 1002, public server 1004 may forward document 1012 or provide further instructions to printing device 1006.

Private server 1002 receives request 1016 from public server 1004 via websocket connection 1005. If no websocket connection exists, then private server 1002 may not receive the request and public server 1004 responds to printing device 1006 with an alert that printing, copying, scanning, and the like for request 1016 is denied. Upon receipt of request 1016, private server 1002 analyzes policy 1010 to determine whether the action is allowed for the user on printing device 1006. Private server 1002 also compiles or accesses ledger 1003 to determine if the action is allowed. Ledger 1003 may be a record or file of all fine grained action within system 1000 that provides the status of the account for the user. For example, ledger 1003 may indicate how many pages that the user has printed in the policy-set period, costs incurred, and other statistics of actions limited by policy 1010.

Update 1020 also may be received at private server 1002 that impact policy 1010 and ledger 1003. Overage 1020 may change the parameters of interest to policy 1010 or provide temporary adjustments to the policy. For example, the user may exceed his/her printing page limit by a specified number of pages for a 24 hour period. The user is attending an important off-site meeting or conference that would provide a good reason to exceed the daily printing limit. Update 1020, however, is not meant to be permanent. In the disclosed embodiments, update 1020 may be implemented in a more efficient manner by keeping policy 1010 at private server 1002 as opposed to having it stored on public server 1004. Private server 1002 does not need to update policies in the public domain or on different devices because all policy analysis and determinations may be performed at the private server. In some embodiments, update 1020 may modify policy 1010 to allow unused usage from a previous period or borrow usage from a future period for a current period.

Depending on the results of the determination, private server 1002 sends response 1022 to public server 1004. Response 1022 may include a copy of document 1012 for printing. Response 1022 may include more than one response, but is shown as a single response for brevity. Public server 1004 may analyze the response to ensure it is appropriate. Public server 1004 forwards response 1022 to printing device 1006, which acts accordingly. In some embodiments, public server 1004 also may send response 1022 or a message associated thereto to user device 1008. The response sent to user device 1008 also may include statistics or information regarding the status of the user's account based on ledger 1003 and policy 1010.

System 1000 shows user device 1008 sending instructions 1014 to printing device 1006. In some embodiments, the user may interact directly with printing device 1006 to process document 1012 thereon. Use of a user device 1008 is not required to print, copy, or scan a document at printing device 1006 or within the public domain.

Figure 11:
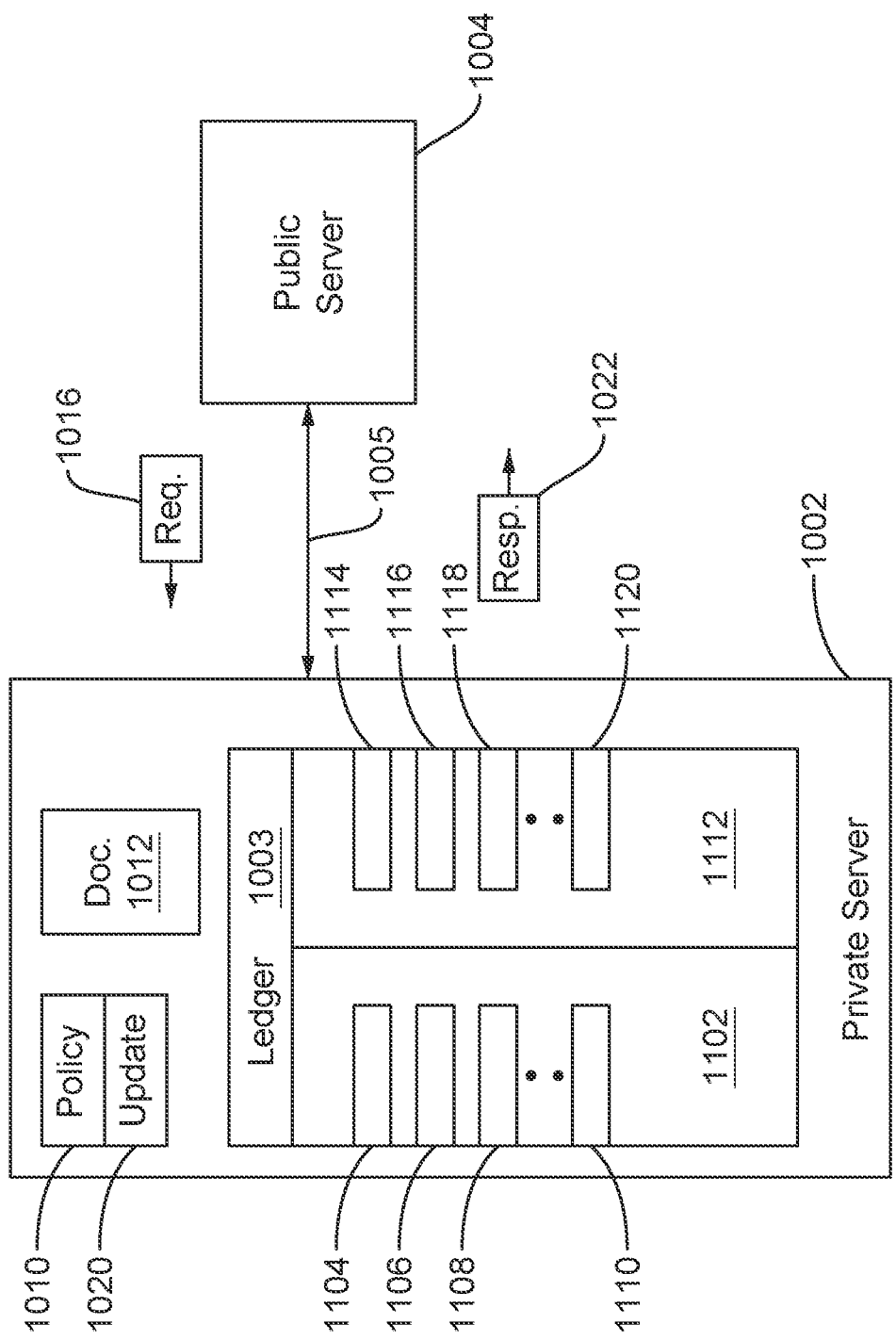
FIG. 11 illustrates a block diagram of implementation of the policy using a ledger on the private server according to the disclosed embodiments.

FIG. 11 illustrates a block diagram of implementation of policy 1010 using private server 1002 according to the disclosed embodiments. FIG. 11 shows a more detailed version of the data moving within system 1000 to implement policy 1010 at private server 1002 for a request received from the public domain. Although FIG. 11 does not show all the components disclosed in system 1000, those components may still be referenced for illustrative purposes.

Request 1016 is received at public server 1004 from printing device 1006. Request 1016 includes a request as to whether the user of user device 1008 may print document 1012. In some embodiments, document 1012 includes a number of pages. In other embodiment, request 1016 may request a plurality of documents from private server 1002.

Public server 1004 serves as the gateway server to private server 1002. Public server 1004 may receive requests and instructions from several printing devices in the public domain. Among other responsibilities, public server 1004 may process or validate request 1016. In some embodiments, public server 1004 may apply policy 1010. In other embodiments, policy 1010 is applied at private server 1002. In some embodiments, printing device 1006 forms request 1016 so that public server 1004 forwards them to private server 1002 without additional or minimal processing at the public server.

For example, the user may request to print document 1012 at printing device 1006. The print job, as disclosed above, may be for 40 pages of printing with a specified cost per page to print. Thus, printing device 1006 may send request 1016 for document 1012 having a size of 40 pages. Alternatively, printing device 1006 may know the number of pages to print as provided by instructions 1014. Request 1016 then may just be a request to print 40 pages.

Upon receipt at private server 1002, the server analyzes policy 1010 to answer the request. For example, policy 1010 may restrict the user to printing or copying 30 pages a week, and may not exceed a set cost per week for all actions. To properly answer these questions, policy 1010 may access ledger 1003 to update the statistics for the user to see if the actions request may be allowed. Update 1020, however, may supersede these limits for a specified period of time to allow printing above what is set forth in policy 1010.

Ledger 1003 may include a record of all fine-grained action, as reflected in the smallest scale possible. Thus, ledger 1003 includes entries 1104, 1106, 1108, and 1110 for a period 1102. The entries indicate that the user accessed a print job having a certain format or characteristics along with a date or timestamp. For example, the number of pages printed at a printing device with the date and time may be an entry. Period 1102 may be a group of entries for the period set forth by policy 1010. For example, policy 1010 may set the period for determining parameter limits to be one day. Thus, period 1102 may be the current day with entries 1104-1110 for print jobs done within the period. For example, the user may have previously printed twenty pages outside the private domain, as reflected in entry 1104.

In processing request 1016, private server 1002 may compile the data available in ledger 1003 to determine if the user actions are still within the policy parameters. Thus, policy 1010 is compared to the compiled results for period 1102 to see if the request regarding printing the pages is granted. Using the above example, private server 1002 determines whether printing the pages associated with request 1016 will exceed the daily limit of 30 and the costs allowed to be charged to the user. If the number of pages or costs exceeds the limit, then policy 1010 indicates that printing the document is not allowed for the user. Update 1020, however, received at private server 1002 earlier that day may modify policy 1010 to allow overage printing for the user for 24 hours. For example, update 1020 may allow for 10 extra pages to be printed based on carryover or borrowed, or future, usage available based on entries within ledger 1003.

Period 1112 is another group of entries in ledger 1003. Entries 1114, 1116, 1118, and 1120 may be print jobs or projects performed in another period, as set forth by policy 1010. Like entries for period 1102, entries 1114-20 include information about the print job, such as pages printed, along with the date and time. Period 1112 may refer to another period that is not the current period 1102. For example, period 1112 may be the previous day's entries for print jobs performed the day before the current period. The entries may be compiled to determine the total number of pages printed for period 1112. Alternatively, period 1112 may reflect the next day and the number of pages allocated for that period. Under this scenario, period 1112 may not include any entries, unless a print job is scheduled for that period. Using these embodiments, ledger 1003 may provide information and statistics to private server 1002 on any period's activity.

Thus, if request 1016 is to print 20 pages at printing device 1006 and ledger 1003 indicates that no pages have been printed that day, then the response to the request is yes. If request 1016 is to print 40 pages, then the response is yes based on update 1020 and that the request is within the 24 hour time period granted by the update, provided that any carryover or borrowed usage is available. If update 1020 is not received, then private server 1002 may determine that the pages may not be printed. The determinations may be performed by calculating usage within the previous period or available for a future period by examining ledger 1003.

By analyzing policy 1010 and performing these query actions at private server 1002, the disclosed embodiments avoid the possible problem that update 1020 is not received at public server 1004 or printing device 1006. Update 1020 allows the printing of 40 pages for the user whereas policy 1010 does not. If update 1020 is not received at public server 1004, for example, then analyzing the policy at the public server would result in a "no" response to the print request. User would not be able to fulfill the request despite being allowed to do so. The disclosed embodiments avoid this problem by processing requests at private server 1002.

Use of ledger 1003 predicts whether using parameter allocations from another period may occur. An overage condition is when the print job of request 1016 results in the page limit in policy 1010 for period 1102 being exceeded.

Update 1020 may allow the overage condition to occur. Determination of whether to allow the overage condition is done on private server 1002. The user, public server 1004, and printing device 1006 do not know the limit. This feature alleviates the need to update resources at these components. If an overage condition is predicted after checking ledger 1003, then private server 1002 may determine whether to still allow response 1022 using the entries for other periods, as disclosed in greater detail below.

After the determination is made, private server 1002 forwards response 1022 to the request to public server 1004. Public server 1004 may forward response 1022 to printing device 1006 to allow or deny processing of the document. Public server 1004 also may forward information to user device 1008. In some embodiments, if the response to an individual request is "no" then public server 1004 may save this response to respond back to the further requests for the print job. As requests 1016 are received, public server 1004 may deny further requests for the print job if a response is no. For example, if the response to request 1016 is that no additional pages may be printed for the user, then public server 1004 may deny further requests to print pages for the print job. Update 1020, however, may allow printing pages in the private domain.

Ledger 1003 also is updated after the overage condition is accepted and the print job allowed by policy 1010 and update 1020. For example, entry 1106 indicates that the user printed 10 pages earlier in the day. Private server 1002 checks entries for period 1102 in ledger 1003 including entry 1106 and determines that the total number of pages will be exceed if request 1016 asks to print 30 pages, which exceeds the policy limit of 30 pages per day. Update 1020 allows for 10 extra pages to be printed in the 24 hour period, provided 10 extra pages have not been used in a previous period or are available to be borrowed from a future period. Applying the overage amount, private server 1002 allows the print job to proceed. Entry 1110 is created in ledger 1003 for the 30 page print job. The amount carried over or borrowed also is update within ledger 1003. For example, if period 1112 is for the previous day, then entry 1120 is created to reflect the usage of 10 pages. Further compilations of the usage for period 1112 will reflect this additional number of pages chargeable to the period.

Figure 12:
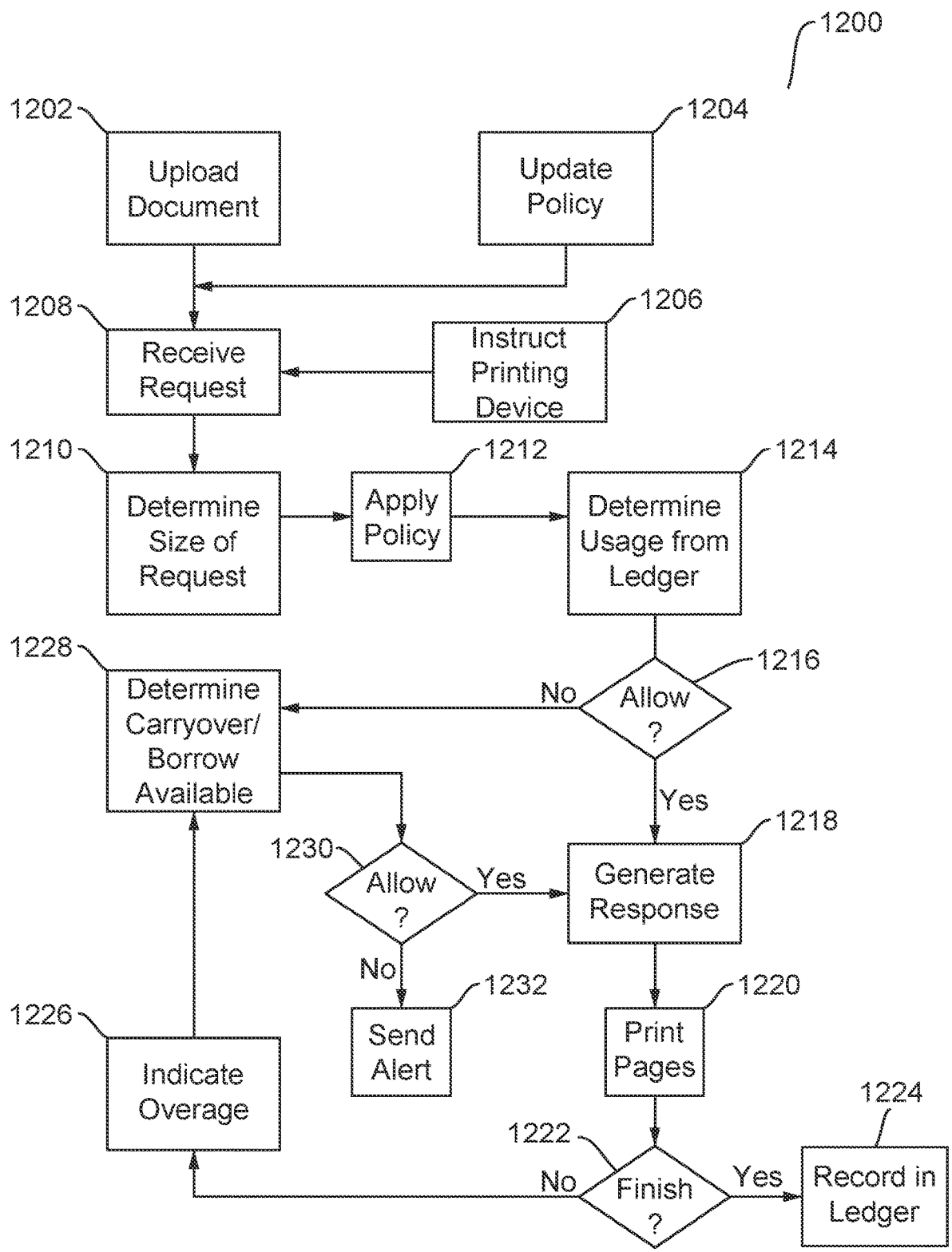
FIG. 12 illustrates a flowchart for allowing carryover or future usage according to the policy at a private server according to the disclosed embodiments.

FIG. 12 depicts a flowchart 1200 for allowing carryover or borrowed usage according to policy 1010 at a private server 1002 according to the disclosed embodiments. FIG. 12 may refer to features of FIGS. 10 and 11 as well as FIGS. 1-9 for illustrative purposes. The embodiments disclosed by flowchart 1200, however, are not limited to the disclosure of FIGS. 1-11.

Step 1202 executes by uploading document 1012 to private server 1002. As disclosed above, the user may upload the document to the private server for access at the corporate offices in a private setting. Others may upload document 1012 as well. Private server 1002 may provide an electronic copy of document 1012 when requested by a printing device connected thereto. Hereinafter, the electronic copy of document 1012 also may be known as document 1012.

Step 1204 executes by updating policy 1010 with update 1020. As disclosed above, update 1020 may allow exceptions to policy 1010, such as an overage condition for a period of time. In some embodiments, update 1020 may instruct policy 1010 to allow access to carryover usage from previous periods if the limits set forth by the policy are exceeded. Update 1020 also may instruct policy 1010 to allow borrowing of usage from future periods. Update 1020 may be stored at private server 1002 with policy 1010. Update 1020 may not apply to all policies on private server 1002 but only those indicated by an administrator or certain criteria.

Step 1206 executes by instructing printing device 1006 to access document 1012 stored on private server 1002. Preferably, user device 1008 sends instructions 1014 from the user to printing device 1006. In other embodiments, user device 1008 may send instructions 1014 to public server 1004. The instructions may request access to document 1012 from printing device 1006 in the public domain. Printing device 1006 generates request 1016 and sends it to public server 1004.

Step 1208 executes by receiving request 1016 from printing device 1006 via public server 1004 at private server 1002. Printing device 1006 sends request 1016 to public server 1004 as it has connection 1005 with private server 1002. Public server 1004 may be connected to a plurality of printing devices. This feature allows private server 1002 to only communicate with public server 1004 and not the plurality of printing devices. Further, changes to procedures may be done at private server 1002 or public server 1004 as opposed a plurality of devices.

Step 1210 executes by determining the size of document 1012 corresponding to request 1016. "Size" may refer to the number of pages in the document. Policy 1010 may limit the amount of printing for a period by the number of pages. In other embodiments, the limits may relate to the size of the file for document 1012. For example, the user may only print so many megabytes per period. As can be appreciated, some pages may include complex data in the form of graphics or pictures that require larger memory storage than text. For the disclosure below, the number of pages may be used as the size of document 1012.

Step 1212 executes by applying policy 1010 to request 1016. This process is disclosed in greater detail above. The parameters of policy 1010 are applied to the proposed print job to see if the limits or restrictions imposed by the policy are met. For example, the user may be limited by policy 1010 to printing 30 pages per day via public server 1004. Further, step 1212 determines whether update 1020 is in effect. Update 1020 may allow exceptions to policy 1010.

Step 1214 executes by determining the usage for the period from ledger 1003. Referring to FIG. 11, the disclosed embodiments may analyze current period 1102 to compile the number of pages already accessed or printed by the user. As used in the examples above, the period set forth by policy 1010 may be a day. The entries for period 1102 are reviewed to determine the total number of pages available to be printed. For example, entries 1104-10 may indicate that the user has printed 10 pages for period 1102. Thus, the user may print 20 more pages according to policy 1010. If document 1012 includes 30 pages, then it may violate policy 1010.

Step 1216 executes by determining whether the print job of request 1016 can be processed or sent to printing device 1006. The proposed usage provided by ledger 1003 is compared to policy 1010. Using the example above, if document 1012 is 20 pages or less then printing may be allowed without further consideration. Step 1218 executes by generating response 1022. Response 1022 may include an indication to printing device 1006 via public server 1004 that the print job is allowed. Response 1022 also may include document 1012 to be printed.

Step 1220 executes by printing the pages of document 1012 at printing device 1006. Step 1222 executes by determining whether printing operations were able to be finished within the limits imposed by policy 1010. If yes, then step 1224 executes by recording the statistics for the print job in ledger 1003. For example, entry 1110 may be created in ledger 1003 with the number of pages printed on printing device 1006. If step 1222 is no, then step 1226 is executed by indicating an overage condition occurred while printing document 1012. Flowchart 1200 proceeds to step 1228.

If step 1216 is no, then the request for document 1012 places the user's account over the limit for the period or an overage condition as well. Preferably, update 1020 allows the policy to consider potential carryover usage from previous periods or borrowing usage from future periods so that the user may complete printing. In some embodiments, there is a limit on how long update 1020 applies to policy 1010. The disclosed embodiments may determine whether update 1020 is still in effect. Flowchart 1200 proceeds to step 1228.

Step 1228 executes by determining the carryover usage or borrowed usage available to the user. This step is disclosed in greater detail below. The disclosed embodiments compile information available in ledger 1003 to determine whether the print job may use available pages not used in a previous period. If not, then the disclosed embodiments may determine whether policy 1010 allows the user to "borrow" pages from a future period to complete printing operations. Ledger 1003 may be updated accordingly to reflect the usage in another period other than current period 1102.

Step 1230 executes by determining whether the print job is allowed based on the available carryover or borrowed usage based on the information in ledger 1003 and policy 1010. If yes, then step 1218 is executed, as disclosed above. If no, then step 1232 executes by sending an alert and denying request 1016. Public server 1004 may be updated to deny further requests from printing device 1006 or other devices from the user.

In performing the disclosed processes, policy 1010, update 1020, ledger 1003, and document 1012 are not provided to public server 1004. All operations and determinations are performed at private server 1002. Thus, the risk of sensitive information being accessed outside the private domain is minimized Further, the user does not know the limits placed thereon by policy 1010 or any exceptions allowed by update 1020.

Figure 13:
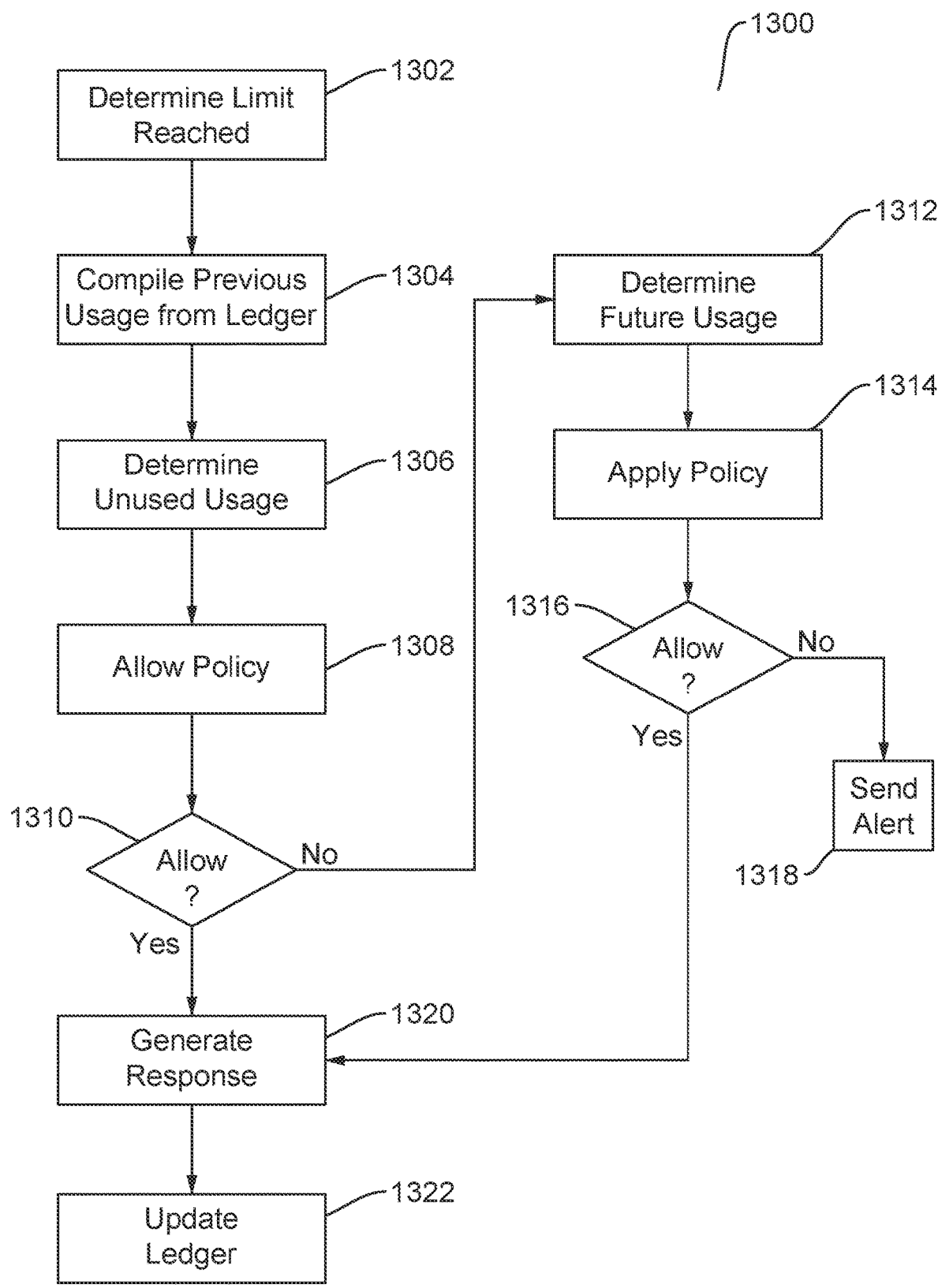
FIG. 13 illustrates a flowchart for determining available carryover or future usage according to the disclosed embodiments.

FIG. 13 illustrates a flowchart 1300 for determining available carryover or borrowed usage according to the disclosed embodiments. FIG. 13 may refer to features of FIGS. 10-12 as well as FIGS. 1-9 for illustrative purposes. The embodiments disclosed by flowchart 1300, however, are not limited to the features of FIGS. 1-12.

Step 1302 executes by determining that the usage limit for the period is reached. This determination may occur as document 1012 is being printed and ledger 1003 updating with each page. It also may occur when policy 1010 is applied to the print job of request 1016. After accessing ledger 1003, the disclosed embodiments determine that the print job will exceed a parameter set forth in policy 1010.

Step 1304 executes by compiling the usage for the previous period from ledger 1003. In some embodiments, the previous period refers to the immediate previous period. Using the above example, if the period set forth by policy 1010 is a day, then period 1102 will refer to the current day and the previous period will refer to the previous day. For example, period 1112 may be the previous day's activity on the account for the user. Step 1304 compiles the usage of period 1112. Using the page example, the disclosed embodiments compile the number of pages printed according to the entries in period 1112.

Step 1306 executes by determining the unused usage from the previous period. If policy 1010 sets forth a page limit of 30 pages per day, then pages may be available for carryover to the current period if this limit was not met. Thus, entries 1114-20 of period 1112 add up to a total of 20 pages. The unused, or available carryover, usage available to the current period is 10 pages.

It should be noted that the disclosed embodiments are not limited to the immediate previous period in performing steps 1304 and 1306. Any previous period in ledger 1003 may be analyzed to compile data on previously unused usage. For example, the disclosed embodiments may compile usage for the previous week, or seven previous periods, to allocate unused usage to current period 1102. Alternatively, if period 1112 does not provide enough carryover usage to current period 1102, then the disclosed embodiments may refer to the next previous period and so on until the requested amount of carryover usage is available. Ledger 1003 will be updated accordingly, as disclosed below.

Step 1308 executes by applying policy 1010 and update 1020 in view of the carryover usage from the one or more previous periods. Policy 1010 is analyzed to determine whether carryover usage is allowed, and, if so, how much. Update 1020 may instruct how long the carryover usage is available. Step 1310 executes by determining whether policy 1010 along with the carryover usage will allow the print job to proceed. If step 1310 is no, then not enough carryover usage is available to allow the print job to proceed at printing device 1006. Flowchart 1300 proceeds to step 1312.

Step 1312 executes by determining future usage available for borrowing to the current period. If there is not enough carryover usage available, then the user account may borrow against future usage. Using the page number example, if the print job is still 10 pages over the daily limit established by policy 1010, then the disclosed embodiments may borrow the 10 pages from the 30 page limit for the subsequent period. Period 1112 may represent the subsequent period, or next day, in this example. No entries have been made for period 1112 so all 30 pages are available to be borrowed. Ledger 1003 provides this information to private server 1002.

Step 1314 executes by applying policy 1010, as disclosed above, except this time with regard to the borrowed usage. Policy 1010 informs whether the borrowing is allowed plus any limits on the borrowing. For example, policy 1010 may limit borrowing to 10 pages, which satisfies the pages needed to complete the print job. It should be noted that the disclosed embodiments are not limited to borrowing only from the immediate subsequent period, but any period in the future. For example, policy 1010 may allow for borrowing up to a week, or seven periods, from current period 1102.

Step 1316 executes by determining whether policy 1010 along with the borrowed usage will allow the print job to proceed. If no, then step 1318 executes by sending an alert and denying the print job request, much like step 1232 in flowchart 1200.

If steps 1310 or 1316 are yes, then step 1320 executes by generating response 1022 and sending the remaining pages of document 1012 to printing device 1006. The print job is allowed even though the limit for usage for the period is exceeded. Step 1322 executes by updating ledger 1003 accordingly. If the print job used carryover usage, then the previous period entries are updated to denote the use of the non-used pages. If the print job used borrowed usage, then an entry may be made in the subsequent period that the daily limit is reduced accordingly.

Although flowchart 1300 discloses using carryover usage then borrowed usage, the disclosed embodiments are not limited to this order. The disclosed embodiments may only consider carryover usage or borrowed usage according to policy 1010. Further, the disclosed embodiments may review the usage available to borrow first before considering any unused usage for printing operations in previous periods.

The following example may illustrate the disclosed embodiments. The user sends instructions 1014 to printing device 1006 using user device 1008 to print a document stored on private server 1002 having 10 pages. Printing device 1006 generates request 1016 to private server 1002 to print the document via public server 1004. Public server 1004 presents the request to private server 1002. The disclosed embodiments compile the usage data for current period 1102. No entries are found for the period. Private server 1002 may apply policy 1010, which sets a daily page limit of 30 pages for the user. As the document of the print job is only 10 pages, private server 1002 allows the document to be sent to printing device 1006. An entry 1104 is made for period 1102 in ledger 1003.

The user sends further instructions 1014 to printing device 1006 to print another document having 30 pages from private server 1002. Printing device 1006 generates and sends request 1016 to private server 1002 via public server 1004. The disclosed embodiments compile the usage information for the current period, which is 10 pages based on entry 1104. Policy 1010 is applied and determines that the new print job exceeds the daily limit of 30 pages by 10 pages. Update 1020 may indicate that the user can access carryover usage based on usage not used from the previous period. If period 1112 represents the previous period, then entries 1114-20 are analyzed to compile the number of pages printed on the previous day. The total number of pages from the previous period may be 25. The disclosed embodiments indicate that 5 pages may be carried over from the previous period.

Applying policy 1010, the 5 carryover pages allow 5 extra pages to be printed for the print job. This result leaves 5 pages still unavailable to be printed. Thus, the disclosed embodiments determine whether future usage may be borrowed according to policy 1010 or update 1020. If yes, then the disclosed embodiments may borrow 5 pages from the 30-page allocation for the next day. Policy 1010 allows the entire print job to proceed accordingly. In some embodiments, private server 1002 may only send the allowed pages and does not send any pages not allowed by policy 1010.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for implementing policy-based printing, the method comprising:
   applying a policy to determine whether to allow a document to be printed from a private server, wherein a request to print the document is received from a public server;
   determining that a parameter for a current period as set forth in the policy denies the document to be printed;
   compiling usage information associated with the parameter for a subsequent period from a ledger on the private server;
   determining a borrowed usage from the usage information for the subsequent period;
   determining whether to allow the document to be printed according to the policy and the borrowed usage; and
   updating the ledger with the borrowed usage.

2. The method of claim 1, wherein the updating includes generating an entry in the ledger for the subsequent period.

3. The method of claim 1, further comprising determining the parameter is exceeded based on usage information for the current period.

4. The method of claim 1, further comprising determining that the parameter denies the document to be printed according to the borrowed usage.

5. The method of claim 4, further comprising compiling usage information associated with the parameter for a previous period.

6. The method of claim 5, further comprising determining a carryover usage based on the usage information for the previous period.

7. The method of claim 6, further comprising determining whether to allow the document to be printed according to the policy and the carryover usage.

\* \* \* \* \*